United States Patent
Verger et al.

(10) Patent No.: US 12,267,553 B2
(45) Date of Patent: Apr. 1, 2025

(54) SYSTEMS AND METHODS OF VIDEO JITTER ESTIMATION

(71) Applicant: Apple Inc., Cupertino, CA (US)

(72) Inventors: Luciano M. Verger, San Jose, CA (US); David L Biderman, Los Gatos, CA (US); Christopher M. Garrido, San Jose, CA (US); Karthick Santhanam, San Jose, CA (US); Brian T. Toombs, San Jose, CA (US); Gurtej Singh G. Chandok, Sunnyvale, CA (US); Joshua L Hare, Sunnyvale, CA (US); Patrick Miauton, Redwood City, CA (US); Ming Jin, Saratoga, CA (US); Bradley F. Patterson, San Luis Obispo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/304,273

(22) Filed: Jun. 17, 2021

(65) Prior Publication Data

US 2021/0400338 A1    Dec. 23, 2021

Related U.S. Application Data

(60) Provisional application No. 63/041,663, filed on Jun. 19, 2020.

(51) Int. Cl.
*H04N 21/44* (2011.01)
*H04N 21/442* (2011.01)
*H04N 21/458* (2011.01)

(52) U.S. Cl.
CPC .. *H04N 21/44004* (2013.01); *H04N 21/44008* (2013.01); *H04N 21/44209* (2013.01); *H04N 21/458* (2013.01)

(58) Field of Classification Search
CPC ....... H04N 21/44004; H04N 21/44008; H04N 21/44209; H04N 21/458; H04N 17/004; H04N 21/4302
See application file for complete search history.

(56) References Cited

U.S. PATENT DOCUMENTS

| | | | |
|---|---|---|---|
| 9,014,266 B1 * | 4/2015 | Gu | H04N 19/58 386/246 |
| 11,184,649 B2 * | 11/2021 | Dunker | H04N 21/44008 |
| 2006/0088000 A1 * | 4/2006 | Hannu | H04L 49/90 370/235 |
| 2007/0019552 A1 * | 1/2007 | Senarath | H04W 8/04 370/235 |

(Continued)

*Primary Examiner* — Yassin Alata
(74) *Attorney, Agent, or Firm* — BakerHostetler

(57) ABSTRACT

A method and apparatus of a device that uses a video jitter buffer to buffer the video frames for a received video stream is described. The device uses the video jitter buffer to estimate the delay variability of the frames and pick a target delay that will help harmonize the playback with minimal loss and delay. This is achieved by estimating the delay spread, which is the result of performing statistical analysis of the measured lags of the video frames received. The video jitter buffer provides target delay recommendation and reference frame information to the video player in order to anchor the playback and schedule the frames presentation time.

23 Claims, 11 Drawing Sheets
(3 of 11 Drawing Sheet(s) Filed in Color)

(56) References Cited

U.S. PATENT DOCUMENTS

| | | | | |
|---|---|---|---|---|
| 2011/0022471 A1* | 1/2011 | Brueck | ............. | G06Q 30/0264 |
| | | | | 709/217 |
| 2011/0299588 A1* | 12/2011 | Zhou | ................... | H04N 19/152 |
| | | | | 375/E7.076 |
| 2012/0039194 A1* | 2/2012 | Kure | ..................... | H04N 19/30 |
| | | | | 375/259 |
| 2013/0166769 A1* | 6/2013 | Chang | ............. | H04N 21/44004 |
| | | | | 709/231 |
| 2013/0282871 A1* | 10/2013 | Jung | ................ | H04N 21/4302 |
| | | | | 709/219 |
| 2015/0172197 A1* | 6/2015 | Sun | ...................... | H04L 47/283 |
| | | | | 370/389 |
| 2015/0207877 A1* | 7/2015 | Ito | ............................ | G06F 1/14 |
| | | | | 709/248 |
| 2015/0288570 A1* | 10/2015 | Astigarraga | ........ | G06F 13/4221 |
| | | | | 703/21 |
| 2015/0319076 A1* | 11/2015 | Vasseur | ................ | H04L 45/124 |
| | | | | 370/238 |
| 2016/0142330 A1* | 5/2016 | Yang | ................ | H04N 21/8453 |
| | | | | 370/231 |
| 2016/0173919 A1* | 6/2016 | Iguchi | .................. | H04N 21/242 |
| | | | | 725/116 |
| 2019/0007698 A1* | 1/2019 | Tanner | ................ | H04N 19/577 |
| 2021/0243712 A1* | 8/2021 | Wen | ................. | H04W 56/0015 |

* cited by examiner

SYSTEMS AND METHODS OF VIDEO JITTER ESTIMATION

This application claims the benefit of U.S. Provisional Application No. 63/041,663 filed on Jun. 19, 2020, which is incorporated herein by reference.

FIELD OF INVENTION

This invention relates generally to video processing and more particularly to estimating video jitter for a video stream.

BACKGROUND OF THE INVENTION

The quality of a real-time video streaming session is highly dependent on being able to reliably play frames in time and without loss. Video frames being transported end to end suffer delay variance, ranging from lower variance in a local area network (LAN) to higher variance in a wide area networks (WAN) where packets traverse across different topologies. Delay variances on video frames can not only occur due to network transports, but additionally due to sender video frame capture/conversion and encoding processes.

To handle the variances in the video stream transport, the video receiver buffers video frames sufficiently to avoid stalls due to jitter from network and sender side (encode or capture jitter). In addition, different video content can have different jitter characteristics based on the bitrate and the resolution. For example, 4 k video incurs more jitter than 1080p video since frames can be larger and more variable in size. The result is more variable encoding times and number of packets needed to carry frames content. For interactive use cases, it is also critical to keep the latency as low as possible.

SUMMARY OF THE DESCRIPTION

A method and apparatus of a device that determines a frame playback scheduling for a video stream is described. In an exemplary embodiment, the device receives the video stream, wherein the video stream includes a plurality of video frame. The device further determines a reference frame that is used to measure a target delay for the video stream. In addition, the device determines the target delay for the video stream, wherein the device uses the reference frame and the target delay to configure the frame playback scheduling for the device.

In another embodiment, a non-transitory machine-readable medium having executable instructions to cause one or more processing units to perform a method to determine a jitter characteristic in a video stream is described. In one embodiment, the machine-readable medium method receives the video stream, wherein the video stream includes a plurality of video frame. The machine-readable medium method further determines a reference frame that is used to measure a target delay for the video stream. In addition, the machine-readable medium method determines the target delay for the video stream, wherein the device uses the reference frame and the target delay to configure a video jitter buffer for the device.

In addition, the target delay can be estimated using a statistical analysis of a plurality of adjusted lag times computed from the plurality of video frames. The machine-readable medium method can further compute a plurality of frame lag times for each of the plurality of video frames. Furthermore, the determining of the reference frame can be based on at least the plurality of frame lag times. Additionally, the machine-readable medium method can adjust the plurality of frame lag time to generate a plurality of adjusted lag times. The machine-readable medium can further assign each of the plurality of adjusted lag times to a bin based on the value of that adjusted lag time. The machine-readable medium can determine a cumulative distribution function based on the distribution of adjusted lag times. The determining of the target delay can be from at least the cumulative distribution function.

In a further embodiment, the video stream can be associated with a mode based on at least a use of the video stream and the mode is used to adjust the jitter characteristics for the video jitter buffer. The mode can be one of latency sensitive and erasure sensitive. In addition, at least one of the target delay and reference frame can change based on at least different lag times of the plurality of video frames.

Other methods and apparatuses are also described.

BRIEF DESCRIPTION OF THE DRAWINGS

The patent or application file contains at least one drawing in color. Copies of the patent or patent application publication with color drawing(s) will be provided by the Office upon request and payment of the necessary fee.

The present invention is illustrated by way of example and not limitation in the figures of the accompanying drawings in which like references indicate similar elements.

DETAILED DESCRIPTION

Figure 1:
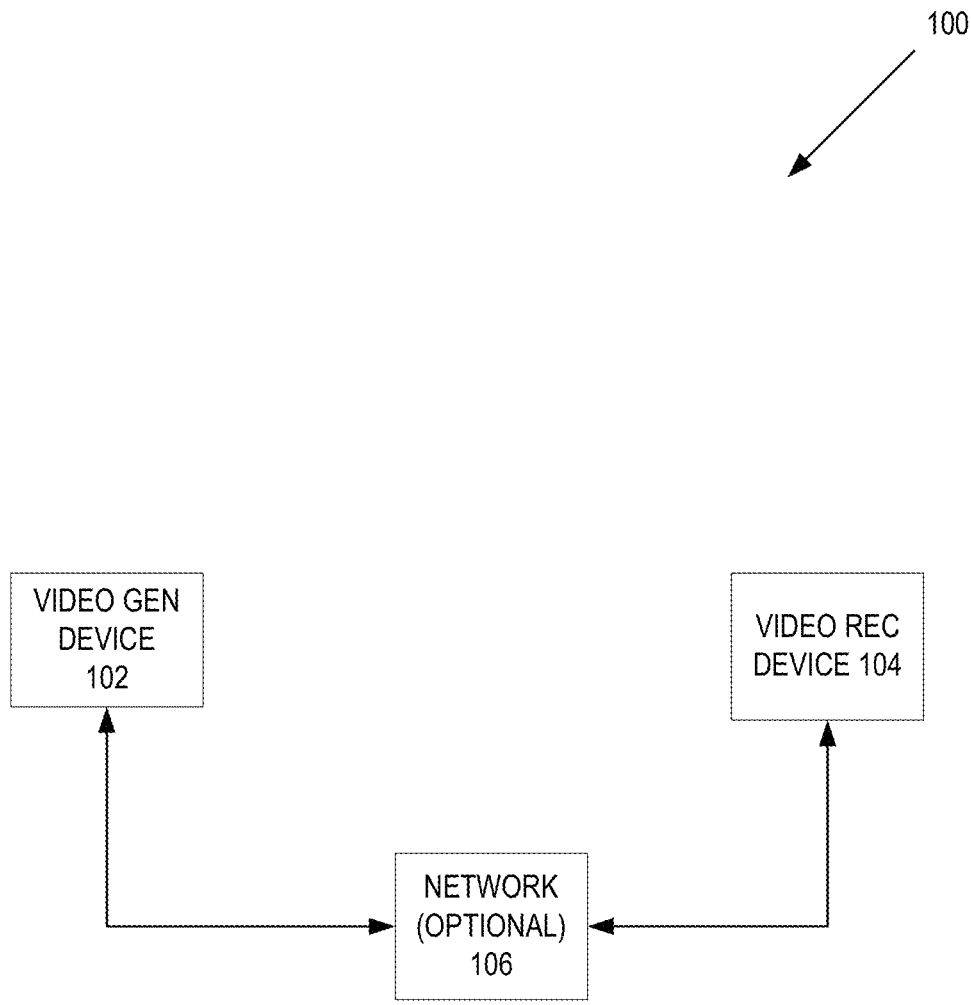
FIG. 1 is an illustration of one embodiment of a system that sends video from a video generating device to a video receiving device.

A method and apparatus of a device that converts an account associated with an application to use a single sign-on service is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a jitter characteristic in a video stream is described. In one embodiment, a device determines a target delay and reference frame that is used to adjust a video jitter buffer. In one embodiment, the quality of a real-time video streaming session is highly dependent on being able to reliably play frames in time and without loss. Video frames being transported end to end suffer delay variance, ranging from lower variance in a local area network (LAN) and higher variance in a wide area networks (WAN) where packets traverse across different topologies. Delay variances on video frames can not only occur due to network transports, but additionally due to sender video frame capture/conversion and encoding processes.

To handle the variance in the video stream transport, the video receiver will buffer video frames sufficiently to avoid stalls due to jitter from network, receiver, and/or sender side (encode or capture jitter). In addition, different video content can have different jitter characteristics based on the bitrate and the resolution. For example, 4 k video incurs more jitter than 1080p video since frames can be larger and more variable in size. The result is more variable encoding times and number of packets needed to carry frames content. For interactive use cases, it is also critical to keep the latency as low as possible.

In one embodiment, the video receiving device uses a video jitter buffer to buffer the video frames in the received video stream to estimate the variability in the video stream and pick a target delay that will help harmonize the playback with minimal loss and delay. This is achieved by estimating the delay variability in the video stream and picking a target delay the video jitter buffer will operate on. Video jitter is the deviation from expected playback time of the video frame.

In one embodiment, a video jitter buffer can be used to determine the delay to be applied in order to have a smooth playback.

In one embodiment, a video jitter buffer is a component that can further measure incoming frame lag variance (jitter) and provides a recommendation of how much of a target delay the playback stack should operate on, in order to guarantee a smooth frame playback cadence with minimal stalls. In this embodiment, the video jitter buffer takes as input information about the video frame being enqueued. This information can include a frame arrival time (last packet arrival time for the frame), frame RTP timestamp (sender timestamp derived from capture time), frame rate, sampling rate, and sequence number, and/or other information). With this information, the video jitter buffer output is the recommendation of how much buffering should be applied to the video frames to guarantee smooth playback as well as a reference frame used to anchor the video stream playback. In one embodiment, the reference frame can be used by the video player to anchor the video stream for the playback of the video stream. This process is essentially latching the playback of the stream to known reference points. The reference frame arrival time and the reference frame RTP timestamp are crucial for calculating the playout time for the other frames that arrive.

FIG. 1 is an illustration of one embodiment of a system 100 that sends video from a video generating device 102 to a video receiving device 104. In one embodiment, the video generating device 102 generates a video stream that is sent to the video receiving device 104, where the video receiving device 104 assembles the video stream into video frames, buffers video frames, and presents the video frames to a user. The video generating device 102 can send the video stream to the video receiving device 104 using one of a variety of video formats (H.264, Motion Pictures Experts Group (MPEG)-4, High-Efficiency Video Coding (HEVC), 3GP, OGG, Windows Media Video (WMV), Audio Video Interleave (AVI), QuickTime® and/or any other type of video streaming format).

In one embodiment, the video generating device 102 can send the video stream over a wired or wireless network 106, such as a local area network (LAN), a local ad hoc network (Wi-Fi, BLUETOOTH, Near Field Communications (NFC), Apple Wireless Direct Link (AWDL), Near-me Area Network (NAN), and/or any other type of ad hoc network), a Wide Area Network (WAN) (a cellular network (e.g., Universal Mobile Telecommunications System (UMTS), Long-Term Evolution (LTE), 5G New Radio (NR), and/or any other type of cellular network), Ethernet, Cable Modem, Fiber-Optic network, and/or any other type of WAN). The network can be an Ethernet network, Wi-Fi, cellular, and/or any other type of network. Alternatively, the video generating device 102 can send the video stream over a local connection with the video receiving device 104, such as a Universal Serial Bus (USB), Thunderbolt, Lighting, or another type of connection capable of supporting a video stream. Each of the video generating device 102 and the video receiving device 104 can be any type of device that can process video (e.g., smartphone, laptop, personal computer, server, tablet, wearable, vehicle component, media device, and/or any type of device that can process instructions of an application).

In one embodiment, the video generating device 102 can be a server transmitting one or more video streams to the video receiving device 104 that is a laptop or a personal computer, where the video generating device 102 transmits the video stream over a WAN. In another embodiment, the video generating device 102 can be a server transmitting one or more video streams to the video receiving device 104 over a LAN. Alternatively, video generating device 102 can be a personal device (e.g., smartphone, tablet, laptop, personal computer, or another type of device) transmitting one or more video streams to the video receiving device 104, which is another personal device. For example and in one embodiment, the video generating device 102 can be a laptop or personal computer and the video receiving device 104 is a tablet, where the video receiving device 104 acts as a secondary display device for the video generating device 102 (e.g., to extend the display of the video generating device 102). In another example and embodiment, the video generating device 102 is a media device (e.g., an Apple TV, Roku, media console, or other type of media device), that is sending a video stream to a video receiving device 104 that is a local device such as a smartphone, media device or tablet that is acting as a secondary display for the video generating device 102. In this example, the primary display would be a television or monitor for the video generating device 102 and the video receiving device 104 can be the secondary display displaying a remote or other type of application working in conjunction with the video generating device 102. In a further example and embodiment, the video generating device 102 is a local device (e.g., smartphone or tablet) that is sending a video stream to a video receiving device 104 that is another local device such as a media device (e.g., an Apple TV, Roku, media console, or other type of media device), laptop, or personal computer that is acting as a secondary display for the video generating device 102. In this example, the video generating device 102 is sending a video stream (or directing a video stream) to the video receiving device 104.

Figure 2:
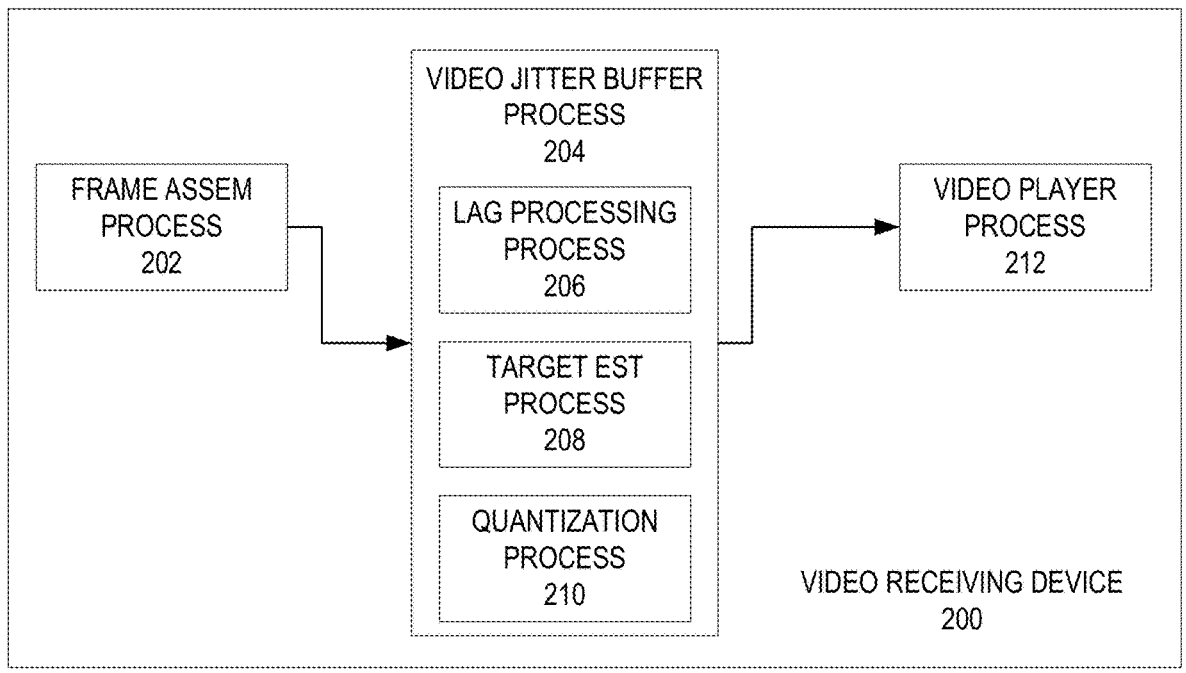
FIG. 2 is an illustration of one embodiment of a video receiving device that receives and processes video.

FIG. 2 is an illustration of one embodiment of a video receiving device 200 that receives and processes video. In FIG. 2, the video receiving device 200 includes frame assembling process 202, video jitter buffer process 204, and video player process 212. In one embodiment, the frame assembling process 202 assembles packets of the video stream into video frames. For example and in one embodiment, the frame assembling process 202 assembles real time protocol (RTP) packets that include video information of the video stream into video frames (or simply, a frame). A frame can be composed of multiple packets. In addition, the frame assembling process 202 can determine information about the video stream (e.g., last packet arrival time for the frame), frame RTP timestamp (sender timestamp derived from capture time), frame rate, sampling rate, and sequence number, and/or other information) and send this information and the assembled video frames to the video jitter buffer process 204. In one embodiment, the video jitter buffer process 204 output is the recommendation of how much buffering should be applied to the video frames to allow for smooth playback as well as a reference timestamp used to anchor the video stream playback.

In one embodiment, the video jitter buffer process 204 measures incoming frame lag variance (jitter) and provides a recommendation of how much of a target delay the playback stack should operate on. The video jitter buffer process 204 sends this delay estimation and a reference frame information to the video player process 212. In one embodiment, the video jitter buffer process 204 includes a lag processing process 206, target estimation process 208, and quantization process 210. In this embodiment, the lag processing process 206 is to estimate a lag for a video frame and is done for each incoming video frame to give a set of estimated frame lags. For lag estimation, the frame arrival time is determined by the arrival time of the RTP packet for the frame that arrives last, which may not be the last packet in the frame sequence, if packets for that frame are reordered in the network. Before lag estimation can happen reliably, the lag processing process 206 needs to ensure that the jitter buffer queues grow to a minimum level and a run state is reached. The different states of the jitter buffer are more in FIG. 4 below.

In one embodiment, the lag estimation can be achieved by anchoring the measurement to a common reference point, known as the reference frame. This reference point at first will be the first frame received once the jitter buffer reaches the fill state. Once the jitter buffer is filled, this reference frame will vary as described in FIG. 5 below. In one embodiment, a lag for a video frame can be estimated as:

$$Lag=(FrameElapsedTime)-(SenderElapsedTimestamp) \quad (1)$$

where FrameElapsedTime is the delta of arrival time of the current frame with respect to the reference frame and SenderElapsedTimestamp is the delta in the sender RTP timestamps between the current frame and the reference frame.

In one embodiment, some streams use sub frames (e.g., 4 tiles per full frame). This helps reduce the bandwidth as the lag processing process 206 would send the tile or tiles in which the content has changed since the last frame was issued. For jitter estimation, the lag processing process 206 uses the last subframe that arrived for a given frame. For example and in one embodiment, if the frame is composed of 2 subframes, 1 and 3, when subframe 3 arrives, the arrival time of the last packet of subframe 3 is used for jitter estimation. In one embodiment, the lag processing process 206 supports variable frame rate, as the lag processing process 206 is aware of the amount of samples per frame.

With the estimated video frame lags, the video jitter buffer process 204 sends the frame information to the lag processing process 206, where the lag processing process 206 sends the frame lag to the video jitter buffer process 204. The video jitter buffer process 204 sends the adjusted lag to the target estimation process 208. The target estimation process 208 estimates the target delay using an analysis of frame lag statistical distribution. Target delay estimation is further described in FIG. 5 below. With the target delay estimation, the video processing device 200 performs quantization using the quantization process 210, which is the process by which the high target delay estimation precision of ¼ frame intervals delay is converted to a more discrete, frame bound estimation. The frame bound estimation and target delay estimation is sent to the video playing process 212, where video playing process 212 uses this quantized delay recommendation for properly scheduling the frames for on-display presentation time.

Figure 3:
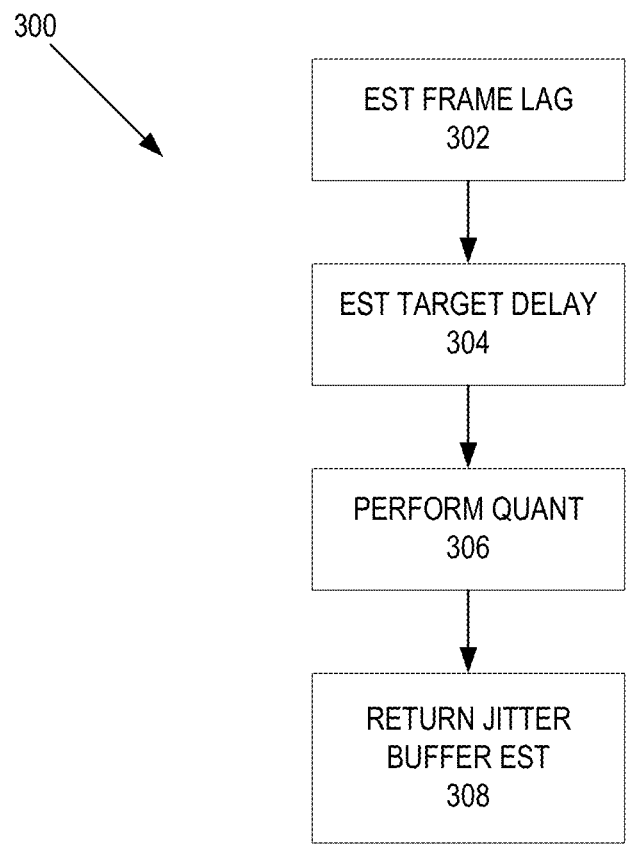
FIG. 3 is a flow diagram of one embodiment of a process that estimates a jitter buffer length.

FIG. 3 is a flow diagram of one embodiment of a process 300 that estimates a target delay estimation. In one embodiment, a video jitter buffer process performs process 300, such as the video jitter buffer process 204 as described in FIG. 2 above. In FIG. 3, process 300 begins by estimating the frame lag at block 302. In one embodiment, process 300 estimates a lag for a video frame using the last packet for the frame and the send timestamp as described in FIG. 2 above. Process 300 estimates the target at block 304. In one embodiment, process 300 estimate the target delay estimation using an analysis of frame lag statistical distribution as described in FIG. 2 above. At block 306, process 300 performs a quantization that the high target delay estimation precision of ¼ frame intervals delay is converted to a more discrete, frame bound estimation. Process 300 returns the jitter buffer estimation and frame reference at block 308.

Figure 4:
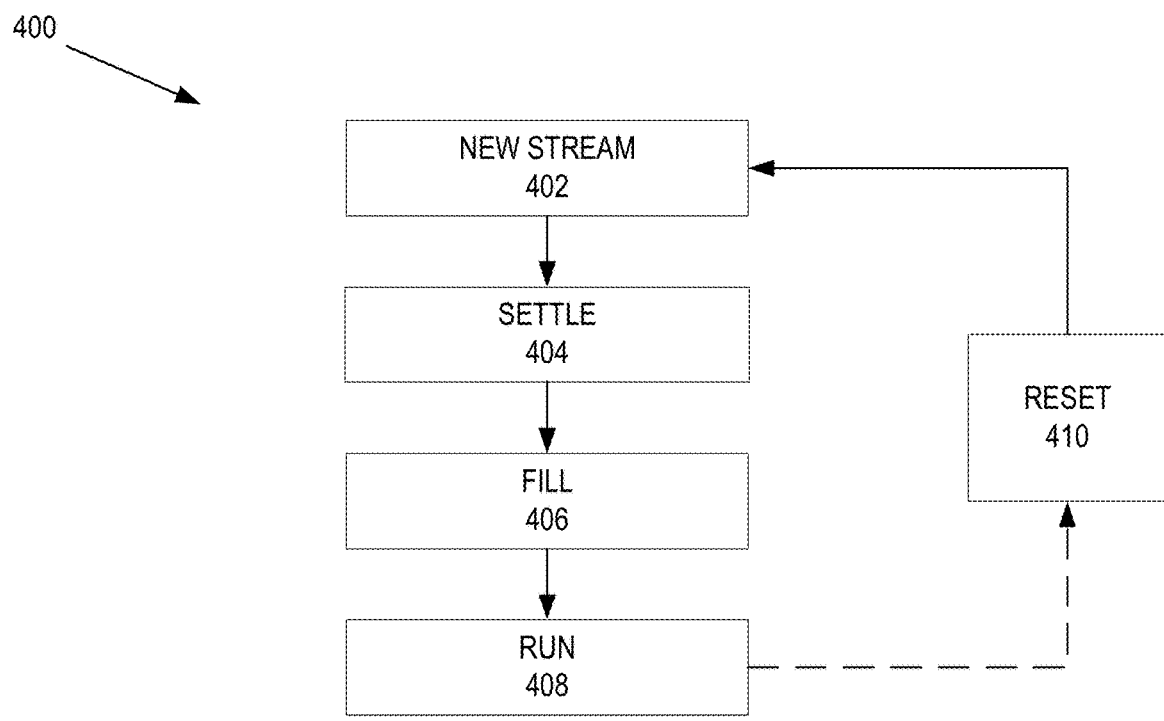
FIG. 4 is an illustration of one embodiment of a block diagram of a set of jitter buffer states.

FIG. 4 is an illustration of one embodiment of a block diagram of a set of jitter buffer states 400. In FIG. 4, the set of jitter buffer states 400 includes the new stream state 402, settle state 404, fill state 406, run state 408, and reset state 410. In one embodiment, the new stream state 402 is the state in which the video jitter buffer process initially receives the video frames. The settle state 404 is that state of when the video jitter buffer waits for the video frame lag to settle. In one embodiment, the threshold of the video frame lag to settle is 1/(frame rate). The fill state 406 is when the video jitter buffer is waiting to fill out the minimum buffer queue size. The run state 408 is the normal operating state of the video jitter buffer. The reset state 410 is the state when the video jitter buffer needs to re-initialize when the video jitter buffer encounters an unrecoverable state or another circumstance that may require re-initialization (e.g., when the video jitter buffer may need to reset the CDF as parameters for the target estimation have changed). A video jitter buffer in the reset state 410 advances to the new state 402 after a re-initialization.

In one embodiment, with the frame lag frame estimates, the video receiving device can determine a target delay for the jitter buffer. In one embodiment, the frames enqueued to the jitter buffer get the lag computed by the lag processing process as described in FIG. 2 above. Because this lag can be positive or negative, this frame lag value needs to be adjusted using a reference frame. In this embodiment, the video processing device estimates a statistically meaningful minimum lag, which can be used to offset the lags into the positive range. In this embodiment, a statistically meaningful minimum lag is the reference frame lag. This new lag is an adjusted lag. The lag and the adjusted lag value are then added to the lag history. Furthermore, in order to estimate the spread of the lags, a Cumulative Distribution Function (CDF) needs to be built with the lags in the lag history, and use a target percentage to estimate the actual delay spread that the jitter buffer will cover. In one embodiment, the actual delay spread to cover is configurable, and any frame with a higher delay may likely be missed. In order to get the CDF, the adjusted lags are first binned into their respective lag bin. Bucket sizes for the lag bins are defined by the content frame rate. In one embodiment, there can be up to 4 bins per frame interval. For 60 frames per second, this is 1/(4*60). Target delay recommendation is formed by picking a configurable percentile in the CDF curve that covers a significant portion of the delay spread, in addition to any optional adjustments that are applied in cases of abnormal jitter conditions.

Figure 5:
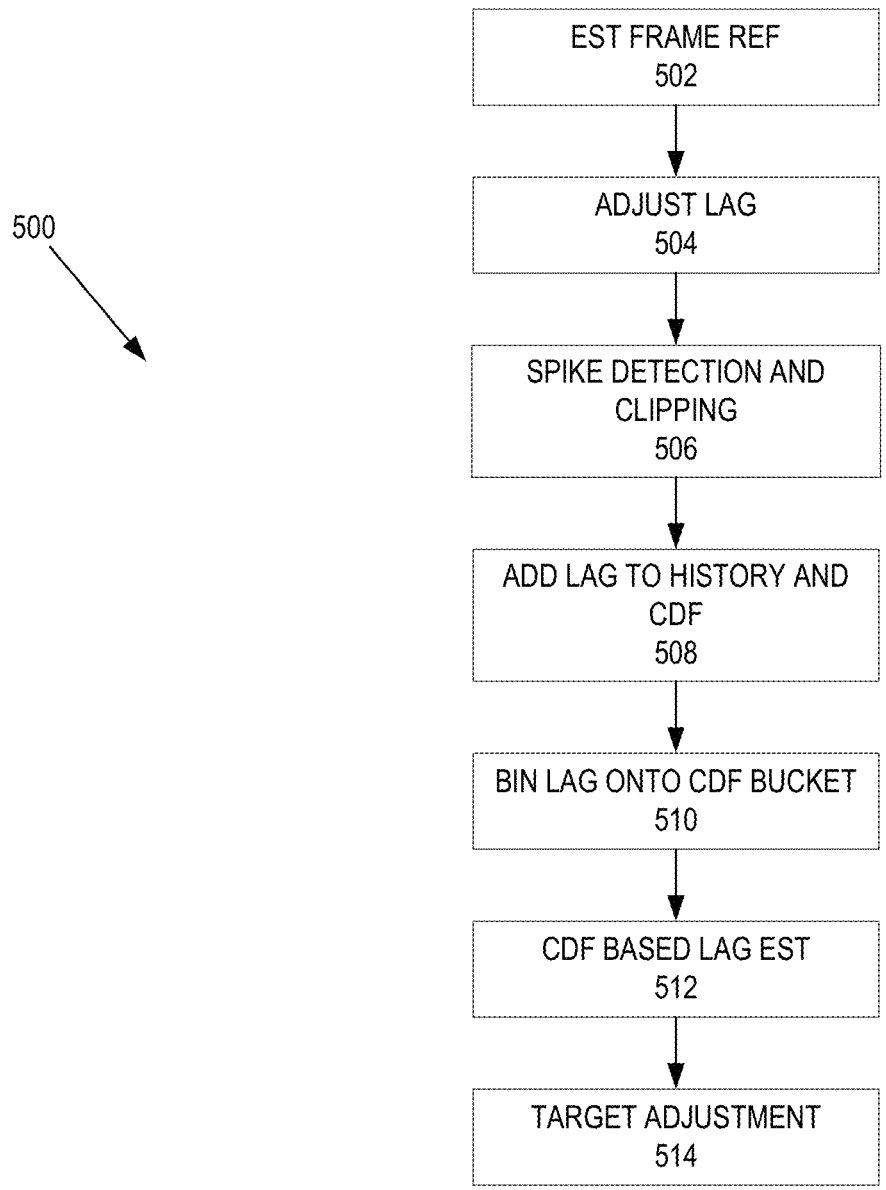
FIG. 5 is a flow diagram of one embodiment of a process to determine a target jitter buffer delay.

FIG. 5 is a flow diagram of one embodiment of a process 500 to determine a target jitter buffer delay. In one embodiment, process 500 is performed by target estimation process, such as the target estimation process 208 as described in FIG. 2 above. In FIG. 5, process 500 begins by estimating the frame reference at block 502. In one embodiment, in order to bin the lags for the different frames, process 500 will need to offset the lags against the reference frame lag (e.g., a minimum lag frame), in order to bring these lags into a positive range. In this embodiment, the lower the minimum lag estimation, the higher will be the total jitter estimated. This, at times, implies unnecessarily adding delay. In order to properly estimate a statistically meaningful reference frame (e.g., a statistically meaningful minimum lag), process 500 uses a statistical analysis that is performed when a received frame's lag is lower than the current min lag selected. In one embodiment, a median lag and lag standard deviation are calculated. In addition, process 500 estimates Kurtosis (peak characteristics) and skewness (tail leaning left or right) coefficients. In one embodiment, these two coefficients are configurable and can help characterize a distribution's normality. For example and in one embodiment, based on some normality parameters, kurtosis can be within +/−1, and skewness can be within +/−2. Furthermore, process 500 estimates a minimum lag threshold. For example and in one embodiment, the minimum lag threshold estimation=Median Lab−(stdevMultipler*stdev). Where stdevMultiplier baseline is 2, but can be corrected+/−using a bounded skewness coefficient. In one embodiment, the skewness is bound to prevent process 500 from picking a significantly skewed reference frame. A new frame's lag can be considered a statistically relevant reference frame if it is higher than the minimum lag threshold.

Figure 6:
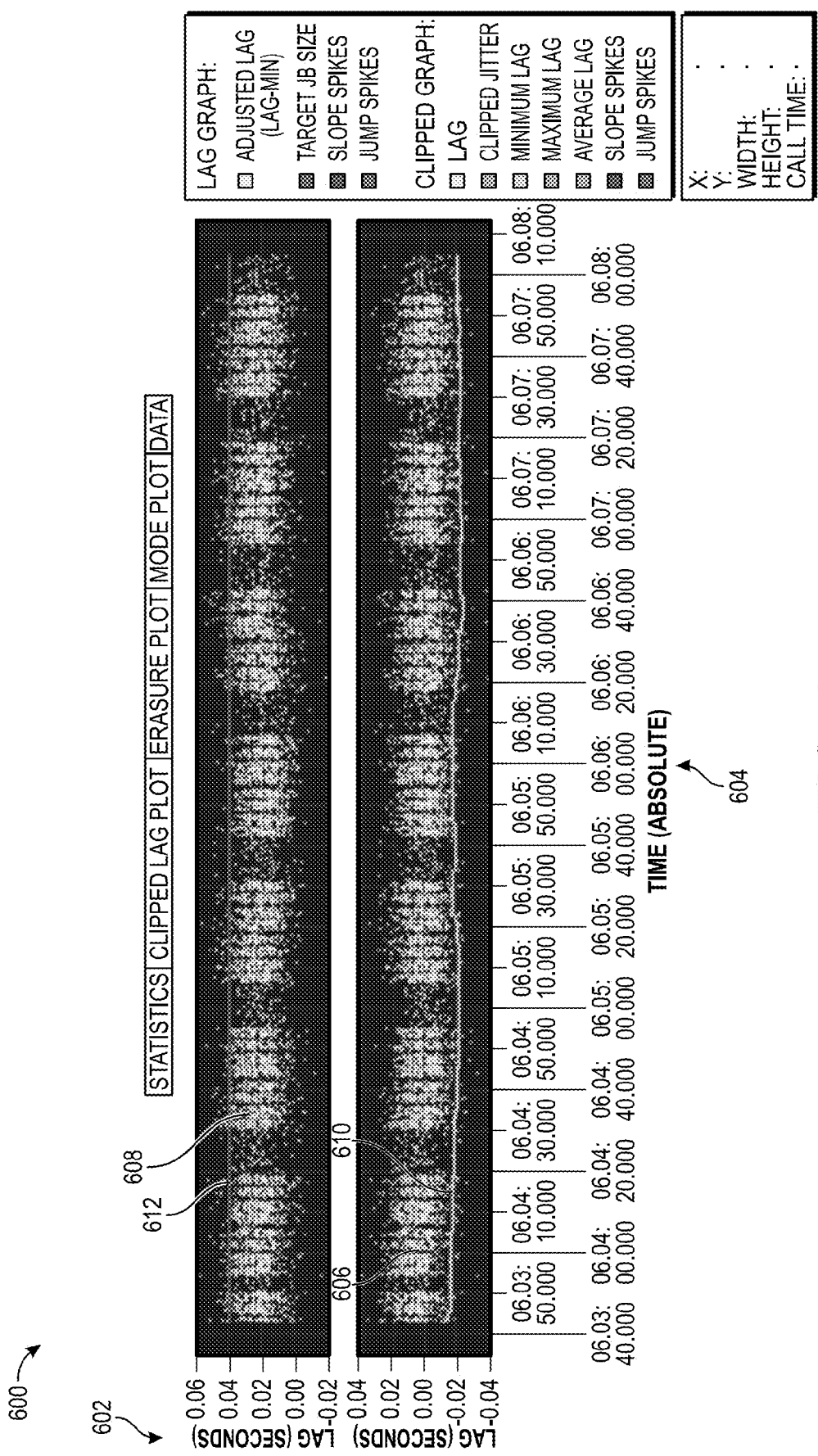
FIG. 6 is an illustration of one embodiment of a plot of frame lags and adjusted lags for the received frames.

In one embodiment, results of statistically meaningful reference frame selection are seen in a jitter plot illustrated in FIG. 6. FIG. 6 is an illustration of one embodiment of a plot 600 of frame lags and adjusted lags for the received frames. In FIG. 6, the bottom plot 606 illustrates non-adjusted lags, where the lags are plot in seconds of lag 602 over time 604. In the bottom plot 606, the reference lags are the line 610. The adjusted lags are plotted in the top plot 608, where the target jitter buffer size is illustrated in the line 612.

Returning to FIG. 5, at block 504, process 500 adjusts the frame lags. In one embodiment, process 500 adjusts the lag using the reference frame as determined in block 502. This can be done to bring the frame lag into a positive range. Process 500 performs spike detection and clipping at block 506. In one embodiment, the jitter of a video stream does not behave in a predictable way, where lags can build-up and form high peaks. In this embodiment, these can be name "slope spikes" and "jump spikes." While in the presence of these spikes it may be necessary to clip the adjusted lag values (e.g., limit the dynamic range of the adjusted lag values). In one embodiment, if no clipping is performed to these lags, CDFs can become significantly skewed.

At block 508, process 500 adds the lag values to a lag history and the two cumulative distribution function (CDF). In one embodiment, once the lags are added to lag history with the proper lag and adjusted lag, the older lag(s) in the lag history that have now fallen outside the moving lag history's window are removed. These lags are subsequently added to two Cumulative Distribution Functions (CDFs). In one embodiment, the two different CDFs can be a short-term CDF and a long-term CDF that each have a different moving window. For example and in one embodiment, the short-term CDF has a window of 2 seconds and the long-term CDF has a window of 5 seconds. In another example, the two CDFs can have different window sizes. Each CDF is built based on different moving windows. Similar to the lag history, when a new lag is added to the CDFs, an older lag in the window are removed. In addition, when the reference frame changes (e.g., the minimum lag as described above), process 500 reconfigures the CDFs. In one embodiment, the reconfiguring can be done by adding an offset for the differences in lag between the older and newer reference frame lag.

Process 500 bins that lag(s) onto each of the CDF's respective buckets at block 510. When it comes to target delay estimation, the process 500 determination can be straight forward, as most of the work has already been done. In one embodiment, process 500 can use a known, and configurable, percentile to cover. In this embodiment, this configuration can represent the percentage of the frames process 500 is to cover with the target delay estimation.

Furthermore, process 500 walks through the bins of both the CDFs, removing the elements from each and estimating the bin that represents the target delay to be recommended (cover+1). The CDF bins are further illustrated in FIG. 7 below. In one embodiment, using ((cover+1)*bucketSize) gives process 500 the target delay in seconds, where the bucketSize=1/(4*60) for 60 frames per sec. In one embodiment, the higher recommendation between the two CDFs (cover+1)'s can be chosen, which allows for fast response to growing jitter, while being conservative to lower target when high jitter period is fading.

Figure 7:
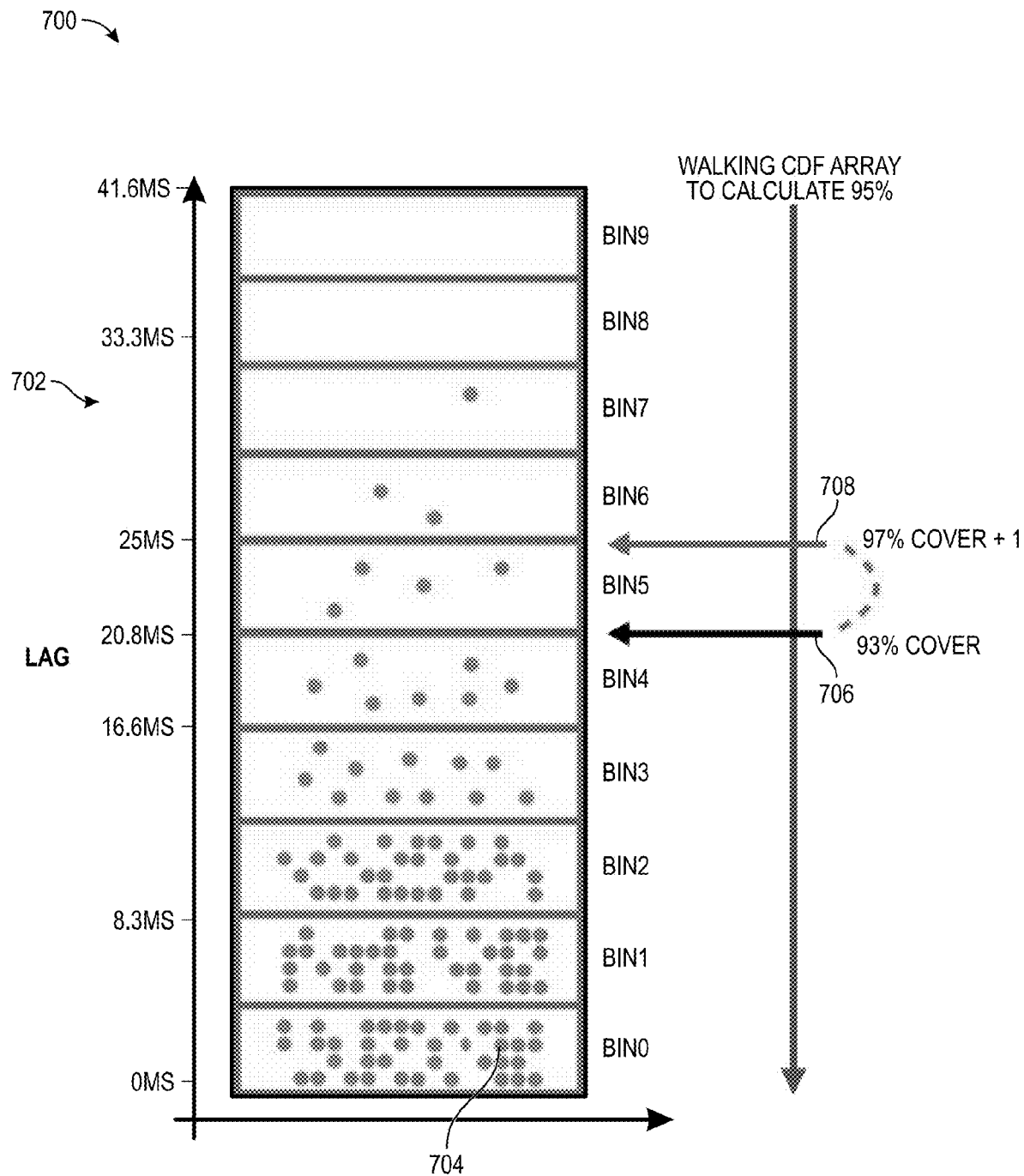
FIG. 7 is an illustration of one embodiment of a graph of different bins for different lag times.

FIG. 7 is an illustration of one embodiment of a graph 700 of different bins for different lag times. In FIG. 7, graph 700 illustrates different bins 704 (e.g., bin0 . . . bin9). In each of the bins 704, the different dots represent the population of the bins for the different adjusted lags computed above between the minimum and maximum value of that bin. In one embodiment, the bin values are in seconds. For example and in one embodiment, bin0, bin1, and bin2, include a large number of lags, whereas bin3, bin4, bin5, bin 6, and bin7 are smaller numbers. While in one embodiment, the bins in FIG. 7 are illustrated for a video stream at 60 frames per seconds (fps), in alternate embodiments, the bins can be constructed for video streams with different rates (e.g., 30 fps, 120 fps, etc.). Furthermore, in FIG. 7, process 500 will walk the bins to determine which set of bins reach 95% of the computed lags. For example, bin0 . . . bin4 will have 93% of the lags 706 and bin0 . . . bin5 has 97% of the computed lags 708.

In one embodiment, while walking through the array that contains the lag counts per bins, process 500 proceeds until proceeds process 500 find the bin that is under the percent to cover. In the example, the percent to cover is 95% . . . 93% is lower, so process 500 goes to the next bin (e.g., cover+1). Thus, process 500 picks the bin right above that will cover>=than 95% of the samples.

Returning to FIG. 5, at block 512, process 500 estimates the target delay using the two CDFs. In one embodiment, using the example CDF array illustrated in FIG. 7, process 500 estimates the target delay by walking through the bins of the CDF array, from top (higher frame lags) to bottom (lower frame lags), and calculating the percentile of frame lags each respective bin will cover. Once process 500 detects that process 500 has reached a bin that is covering less than the configured percentile (95% in this example), represented by 706 in the FIG. 7, process 500 returns the respective delay value the bin above represents (cover+1), as shown in the FIG. 7 (708), which corresponds to 25 ms. Process 500 performs the same process on each CDF, (for example, the short-term and long-term, CDFs) and obtains two candidate target values. Process 500 picks the highest candidate target delay from the CDFs as the selected target delay.

Figure 8:
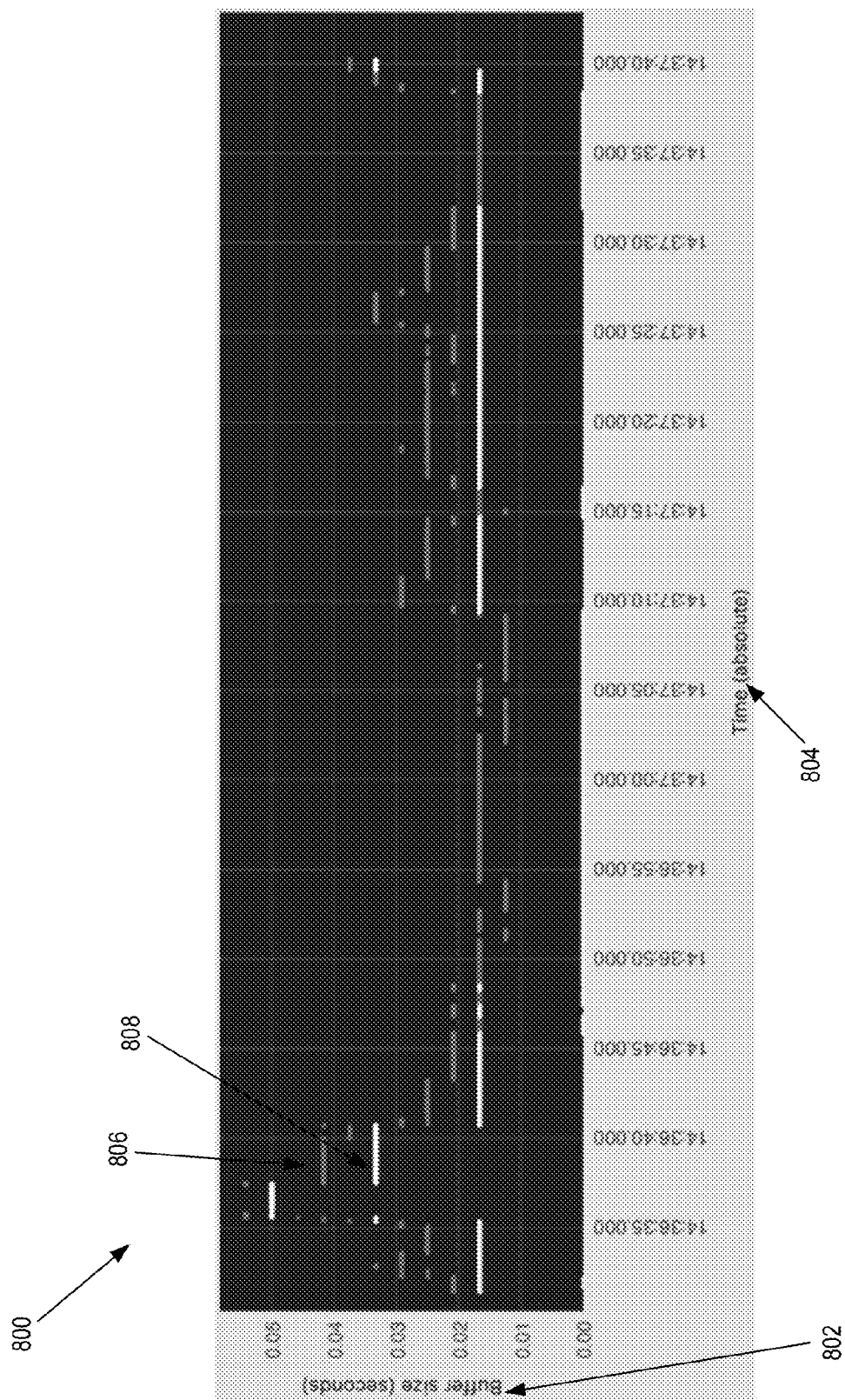
FIG. 8 is an illustration of one embodiment of a graph illustrating a quantization process.

FIG. 8 is an illustration of one embodiment of a graph 800 illustrating a quantization process. In FIG. 8, FIG. 8 illustrates a high precision target delay 806 and quantized target delay 808, where each of these delay change over time 804. The delay 806 and 808 are measured in seconds 802.

In one embodiment, there are use cases for real-time video playback that require different treatment. Real-time gaming and highly interactive applications benefit significantly from very low end to end latency, while high resolution movie/video playback is more enjoyable when the playback is smooth and stall free in spite of higher latencies. Due to these reasons, the video jitter buffer can support different use cases by incorporating the concept of modes. While in one embodiment, two modes of operation are supported, in alternate embodiments, other mode can be added. In one embodiment, Latency Sensitive and Erasure Sensitive modes are supported.

Based on the use case, a jitter buffer mode can be changed. Mode change entails a re-configuration of the JB to behave according to the mode's configuration. Table 1 lists the configuration differences of both modes.

TABLE 1

Configuration for Different Modes at a Particular Frame Rate (e.g., 60 frame per seconds)

| | Jitter Buffer Modes | |
|---|---|---|
| Properties | Latency Sensitive | Erasure Sensitive |
| Min Queue size | 0 ms | 33 ms |
| Max Queue size | 66 ms | 83 ms |
| Lag CDF Percentile % | 95% | 98% |
| Additional Delay Compensation | 0 frames | 16 ms |
| Min Delay | 0 ms | 50 ms |
| Max Delay | 66.66 ms | 100 ms |
| Objective | Low latency | Playback smoothness/max quality |
| Application | Gaming/Interactive App | Movies/Video |

In one embodiment, the Latency Sensitive mode is configured to provide lower latency, it is designed to cover 95% of the lags. This mode has a min Queue size of 0 ms and max Queue size 66 ms. The lag CDF percentile for this mode is 95% (e.g., to cover 95% of the lags). In addition, the Latency Sensitive mode has a minimum delay of 0 ms and a maximum delay of 66.66 ms. In contrast, the Erasure Sensitive mode is configured to maximize frame rate and the delay estimation is designed to cover 98% of the lags. This mode has a min Queue size of 33 ms and max Queue size 83 ms. The lag CDF percentile for this mode is 98% (e.g., to cover 98% of the lags). In addition, the Erasure Sensitive mode has an Additional delay compensation of 16 ms that is added on top of the target delay estimation. Furthermore, the Erasure Sensitive mode has a minimum delay of 50 ms and a maximum delay of 100 ms. This can serve as additional cushion for jitter in the system, that the CDF based estimation (on recent past lag history) may not be able to predict. In another embodiment, the parameters can have the same or different values.

In one embodiment, Table 1 is based on a certain frame rate. The parameters may change at different frame rates. This table would likely be different if we use 120 fps or 30 fps, for example.

In one embodiment, different video content can have different jitter characteristics based on the bitrate and resolution. For example, 4 k video incurs more jitter than 1080p video, since frames are larger and more variable in size. Another example is high motion content that can incur a higher bitrate. The result is more variable encoding times (encode jitter). Frames are assembled into IP packets (RTP over UDP), with a packet size limit of 1500 bytes. Higher bitrate content can produce significantly more packets per frame for some frames, and a smaller number of packets for other frames. The higher variability in number of packets per frame, in turn, creates more network jitter.

Due to these facts, in one embodiment, the jitter buffer can be made to be content aware. When content resolution or high motion characteristics change, the configuration needs to be adapted dynamically to adjust to a higher jitter expectation. Content size change detection happens at the Video Receiver, by comparing previous frame width and height against the new frame received. Upon detecting a change, a different jitter buffer mode/configuration is selected and propagated to the video jitter buffer. In one embodiment, motion intensity detection could be signaled from sender (encoder) to receiver via in-band signaling. This could be used to prepare the jitter buffer in advance to absorb a higher delay variance. Upon detection and signaling, the video jitter buffer will incur a state machine change from Run to Reset, and back into a New Stream.

Figure 9:
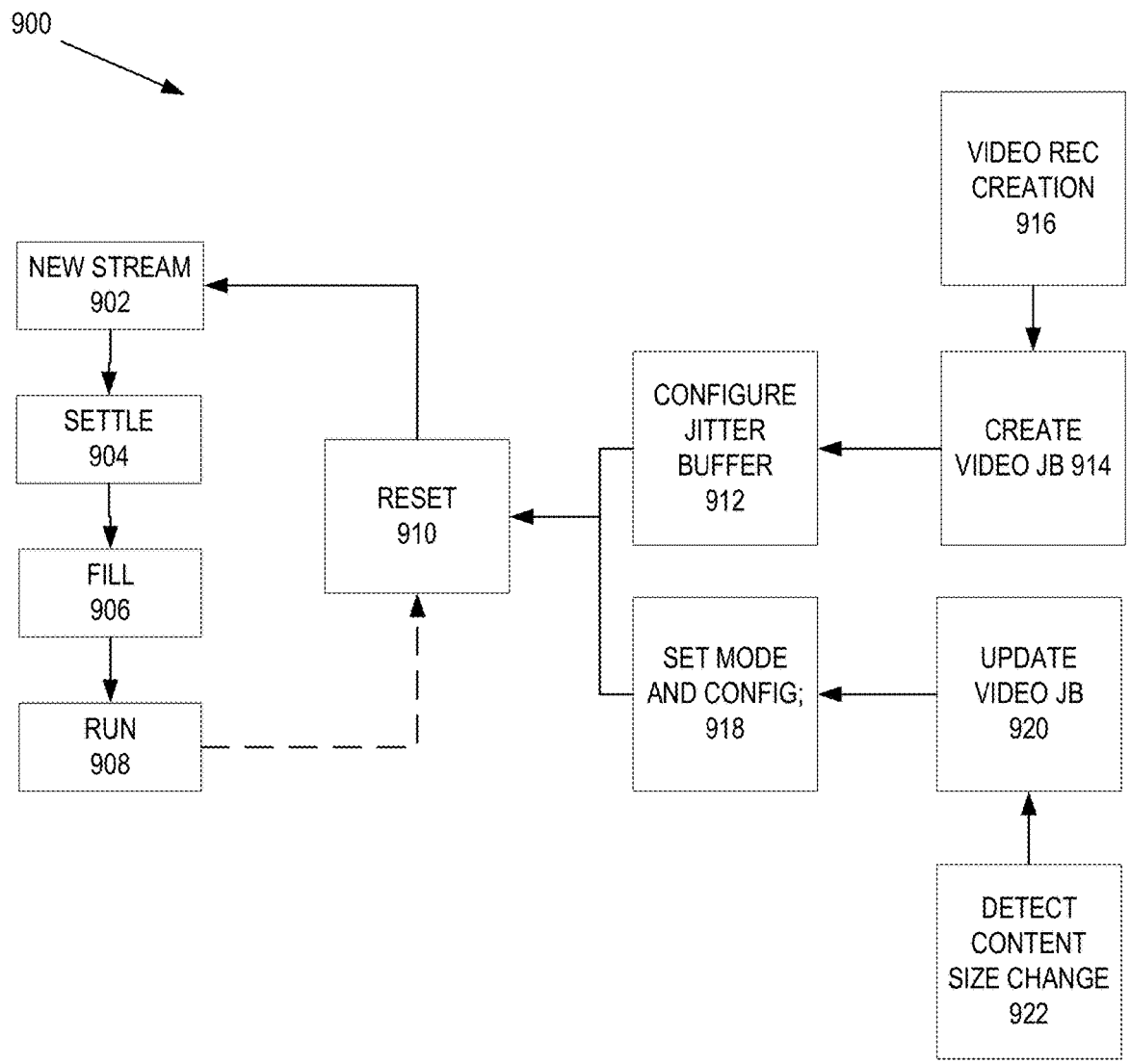
FIG. 9 is an illustration of one embodiment of a block diagram of a set of content aware jitter buffer states.

FIG. 9 is an illustration of one embodiment of a block diagram of a set of content aware jitter buffer states 900. In FIG. 9, the set of content aware jitter states 900 includes the new stream state 902, settle state 904, fill state 906, run state 908, and reset state 910. In one embodiment, the new stream state 902 is the state in which the video jitter buffer process initially receives the video frames. The settle state 904 is that state of when the video jitter buffer waits for the video frame lag to settle. In one embodiment, the threshold of the video frame lag to settle is 1/(frame rate). The fill state 906 is when the video jitter buffer is waiting to fill out the minimum buffer queue size. The run state 908 is the normal operating state of the video jitter buffer. The reset state 910 is the state when the video jitter buffer. In one embodiment, the reset state 910 is as the reset state 410 described in FIG. 4 above.

In addition, and in one embodiment, different mechanisms can cause the video jitter buffer to reach the reset state. In one embodiment, the video receiving device can detect a change in the content size (922). In one embodiment, the video receiving device can compare the previous frame width and height against the new frame received. Upon detecting a change, the video receiving device selects a different jitter buffer mode/configuration and propagates this new jitter buffer mode/configuration to the video jitter buffer (920). The video jitter buffer sets the new jitter buffer mode/configuration and sets the video jitter buffer into reset state so that the video jitter buffer can re-acquire the stream by going to the new stream state (902).

In another embodiment, when the video receiver (916) is created, the video receiver (916) creates a video jitter buffer (914). The video receiving device sets the mode and configuration for the video jitter buffer (912). In addition, the video receiving device puts the video jitter buffer into the reset state (910).

Figure 10:
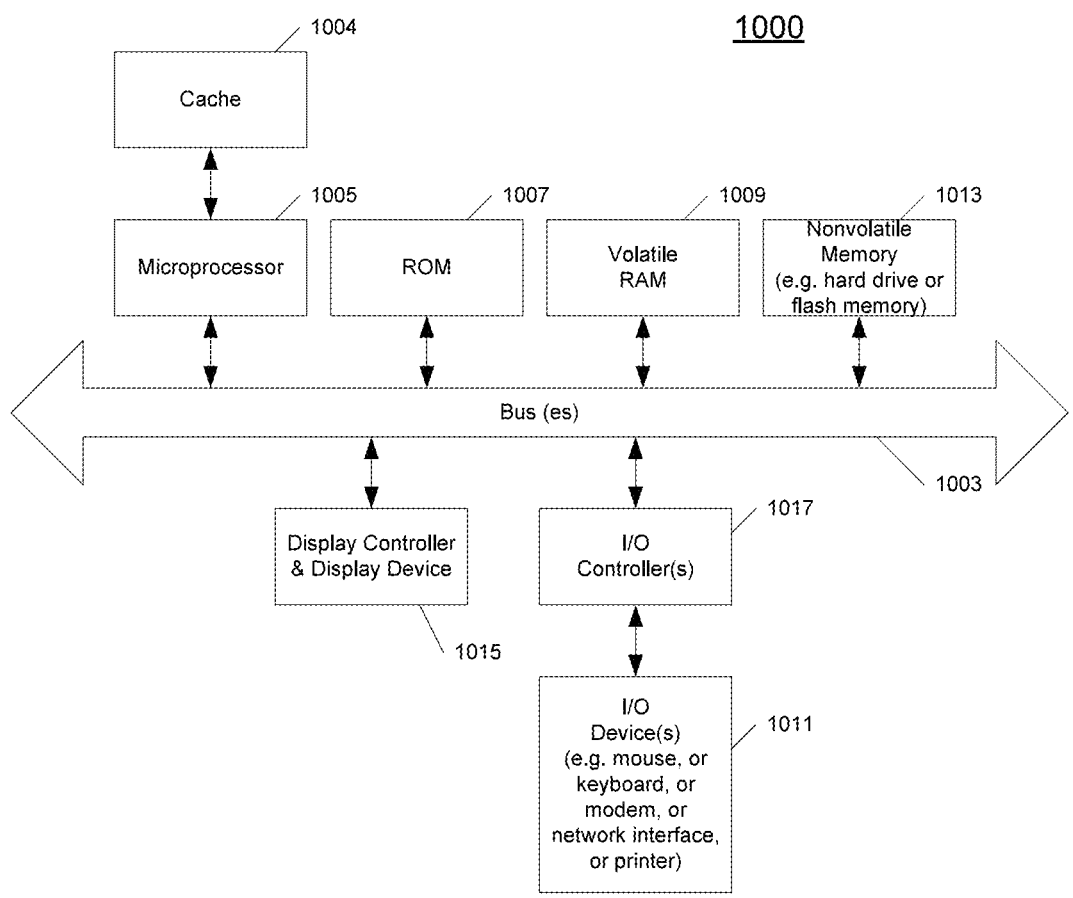
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented as a system that includes video receiving device 104 as illustrated in FIG. 1 above. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 10010 and volatile RAM 1009 and a non-volatile memory 1011. The microprocessor 1005 may include one or more CPU(s), GPU(s), a specialized processor, and/or a combination thereof. The microprocessor 1005 may retrieve the instructions from the memories 10010, 1009, 1011 and execute the instructions to perform operations described above. The bus 1003 interconnects these various components together and also interconnects these components 1005, 10010, 1009, and 1011 to a display controller and display device 1019 and to peripheral devices such as input/output (I/O) devices which may be mice, keyboards, modems, network interfaces, printers and other devices which are well known in the art. Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Figure 11:
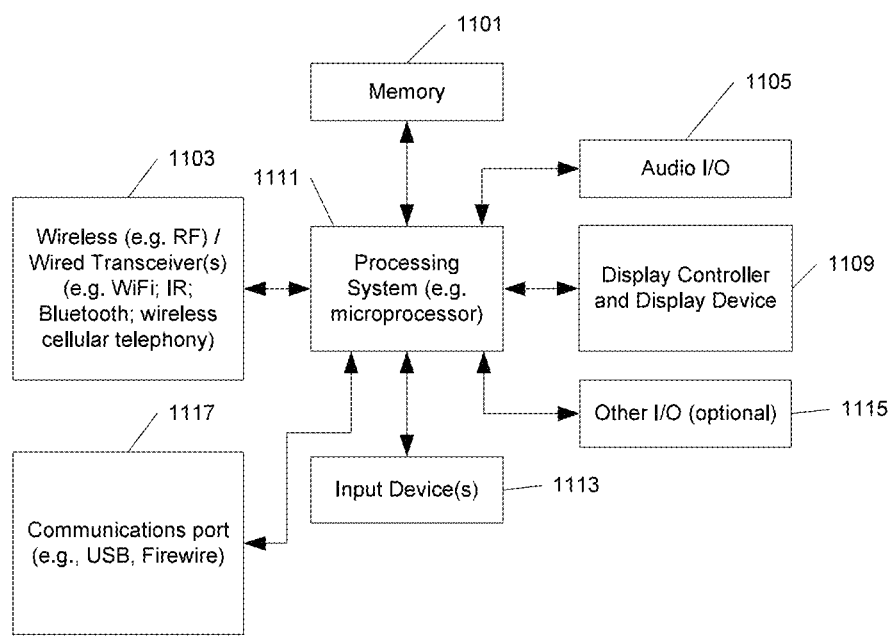
FIG. 11 shows an example of a data processing system, which may be used with one embodiment of the present invention.

FIG. 11 shows an example of another data processing system 1100 which may be used with one embodiment of the present invention. For example, system 1100 may be implemented as video receiving device 104 as shown in FIG. 1 above. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105, which may include a microphone and a speaker for, for example, playing back music or providing telephone functionality through the speaker and microphone.

A display controller and display device 1109 provide a visual user interface for the user; this digital interface may include a graphical user interface which is similar to that shown on a Macintosh computer when running OS X operating system software, or Apple iPhone when running the iOS operating system, etc. The system 1100 also includes one or more wireless transceivers 1103 to communicate with another data processing system, such as the system 1000 of FIG. 10. A wireless transceiver may be a WLAN transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 10 may also be used in a data processing system. The system 1100 further includes one or more communications ports 1117 to communicate with another data processing system, such as the system 1000 of FIG. 10. The communications port may be a USB port, Firewire port, Bluetooth interface, etc.

The data processing system 1100 also includes one or more input devices 1113, which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 10 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1100 may be a network computer or an embedded processing device within another device, or other types of data processing systems, which have fewer components or perhaps more components than that shown in FIG. 10.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, CA, a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "computing," "adjusting," "assigning," "requesting," "sending," "loading," "returning," "selecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to determine a frame playback scheduling for a video stream, the method comprising:
receiving, on a device, the video stream, wherein the video stream includes a plurality of video frames;
determining a reference frame that is used to measure a target delay for the video stream, wherein the reference frame is a frame that is received after a jitter buffer fills up;
determining the target delay for the video stream, wherein the device uses the reference frame and the target delay to configure frame playback scheduling for the device by, computing a target delay using a percentile of a statistical distribution of multiple frame lag times between the reference frame and a subset of the plurality of video frames, wherein the statistical distribution includes a short time frame lag time distribution and a long time frame lag time distribution.

2. The non-transitory machine-readable medium of claim 1, wherein the target delay is estimated using a statistical analysis of a plurality of adjusted lag times computed from the plurality of video frames.

3. The non-transitory machine-readable medium of claim 1, further comprising:
computing a plurality of frame lag times for each of the plurality of video frames.

4. The non-transitory machine-readable medium of claim 3, wherein the determining of the reference frame is based on at least the plurality of frame lag times.

5. The non-transitory machine-readable medium of claim 3, wherein the determining of the reference frame further comprises:
computing a statistically meaningful minimum lag by using at least a kurtosis coefficient and a skewness coefficient when one of the plurality of frame lag times is less than a current minimum lag.

6. The non-transitory machine-readable medium of claim 3, wherein a lag time from the plurality of frame lag times is statistically relevant when that lag time is greater than a minimum lag threshold.

7. The non-transitory machine-readable medium of claim 3, further comprises:
adjusting the plurality of frame lag time to generate a plurality of adjusted lag times.

8. The non-transitory machine-readable medium of claim 7, further comprising:
assigning each of the plurality of adjusted lag times to a bin based on a value of that adjusted lag time.

9. The non-transitory machine-readable medium of claim 8, further comprising:
determining a cumulative distribution function based on the distribution of adjusted lag times.

10. The non-transitory machine-readable medium of claim 9, wherein the determining of the target delay is from at least the cumulative distribution function.

11. The non-transitory machine-readable medium of claim 1, wherein the video stream is associated with a mode based on at least a use of the video stream and the mode is used to dynamically adjust jitter buffer behavior for a video jitter buffer.

12. The non-transitory machine-readable medium of claim 11, wherein the mode can be one of latency sensitive and erasure sensitive.

13. The non-transitory machine-readable medium of claim 11, wherein the mode of the video stream is based on at least a content type of the video stream.

14. The non-transitory machine-readable medium of claim 1, wherein at least one of the target delay and reference frame can change based on at least different lag times of the plurality of video frames.

15. The non-transitory machine-readable medium of claim 1, wherein the device uses the reference frame to anchor frame playback.

16. The non-transitory machine-readable medium of claim 1, wherein the short time frame lag time distribution has a shorter time window that the long time frame lag time distribution.

17. The non-transitory machine-readable medium of claim 1, wherein a frame lag time distribution is a cumulative distribution function.

18. A method to determine a frame playback scheduling for a video stream, the method comprising:
receiving, on a device, the video stream, wherein the video stream includes a plurality of video frames;
determining a reference frame that is used to measure a target delay for the video stream, wherein the reference frame is a frame that is received after a jitter buffer fills up;
determining the target delay for the video stream, wherein the device uses the reference frame and the target delay to configure frame playback scheduling for the device by,
computing a target delay using a percentile of a statistical distribution of multiple frame lag times between the reference frame and a subset of the plurality of video frames, wherein the statistical distribution includes a short time frame lag time distribution and a long time frame lag time distribution.

19. The method of claim 18, further comprising:
computing a plurality of frame lag times for each of the plurality of video frames.

20. The method of claim 19, wherein the determining of the reference frame is based on at least the plurality of frame lag times.

21. The method of claim 20, wherein the determining of the reference frame further comprises:
computing a statistically meaningful minimum lag by using at least a kurtosis coefficient and a skewness coefficient when one of the plurality of frame lag times is less than a current minimum lag.

22. The method of claim 18, wherein the short time frame lag time distribution has a shorter time window that the long frame time lag time distribution.

23. The method of claim 18, wherein a frame lag time distribution is a cumulative distribution function.

* * * * *